(12) United States Patent
Koivisto et al.

(10) Patent No.: US 8,825,069 B2
(45) Date of Patent: Sep. 2, 2014

(54) METHODS, APPARATUS AND COMPUTER PROGRAMS FOR CONFIGURING USER EQUIPMENT

(75) Inventors: Tommi Koivisto, Espoo (FI); Timo Roman, Espoo (FI)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/614,052

(22) Filed: Sep. 13, 2012

(65) Prior Publication Data
US 2013/0244676 A1    Sep. 19, 2013

(30) Foreign Application Priority Data

Mar. 19, 2012  (GB) .................................. 1204734.6

(51) Int. Cl.
*H04W 72/00*    (2009.01)

(52) U.S. Cl.
USPC ...................................................... 455/452.1

(58) Field of Classification Search
USPC ......... 370/315, 252, 329, 336, 219, 331, 330, 370/335; 455/450, 509, 562.1, 434, 452.1; 375/260, 295
See application file for complete search history.

(56) References Cited

U.S. PATENT DOCUMENTS

| | | | |
|---|---|---|---|
| 2007/0274409 A1 | 11/2007 | Park | |
| 2008/0273453 A1 | 11/2008 | Manakkal et al. | |
| 2011/0299607 A1 | 12/2011 | Nakayama | |
| 2011/0305161 A1* | 12/2011 | Ekpenyong et al. | 370/252 |
| 2012/0033608 A1* | 2/2012 | Seo et al. | 370/315 |
| 2012/0120903 A1* | 5/2012 | Kim et al. | 370/329 |
| 2012/0201163 A1* | 8/2012 | Jongren et al. | 370/252 |

FOREIGN PATENT DOCUMENTS

WO    WO 2011/123747 A1    10/2011

OTHER PUBLICATIONS

Combined Search and Examination Report for GB Application No. GB1204734.6, dated Jul. 25, 2012 (6 pgs.).
Applicant's Response to Combined Search and Examination Report for GB Application No. GB1204734.6 dated Sep. 7, 2012 (12 pgs.).
Notification of Allowance for GB Application No. GB1204734.6, dated Sep. 27, 2012 (1 pg.).

* cited by examiner

*Primary Examiner* — Kiet Doan
(74) *Attorney, Agent, or Firm* — Stanton IP Law

(57) ABSTRACT

Examples are described relating to methods, apparatus and computer programs for configuring a user equipment in a cellular wireless network. Certain exemplary methods involve receiving (440), at the user equipment (430), control information regarding one or more of a plurality of channel-state information (CSI) reference signals. The plurality of CSI reference signals are receivable by the user equipment (430) from one or more of a plurality of antenna ports that form part of the cellular wireless network, the plurality of CSI reference signal being associated with corresponding antenna ports. The control information is for use in configuration of the user equipment (430) and is received over a radio communications downlink from a node (410) in the cellular wireless network. If estimation of one or more radio communication channels at the user equipment (430) is configured (450) based on the received control information, improvements in demodulation and CSI feedback are achieved.

16 Claims, 12 Drawing Sheets

| Bit field | Interpretation |
|---|---|
| 00 | CSI-RS resource #1 is used as the reference for the whole band |
| 01 | CSI-RS resource #2 is used as the reference for the whole band |
| 10 | Both CSI-RS resources are assumed to be transmitting over the whole band, i.e. UE takes the reference for channel statistics based on the aggregated (joint) radio channel from CSI #1 and #2 |
| 11 | CSI-RS resources to be used as a reference follow the latest CSI feedback report transmitted by the UE |

*FIG. 6A*

| Antenna configuration per CSI-RS resource | Options available for signaling | Number of bits required |
|---|---|---|
| 2-Tx | [1 1] or [2] | 1 bit |
| 4-Tx | [4], [2 2], [1 1 2], [1 1 1 1] | 2 bits |
| 8-Tx | [8], [4 4], [2 2 4], [2 2 2 2], [1 1 2 2 2], [1 1 1 1 2 2], [1 1 1 1 1 2], [1 1 1 1 1 1 1 1] | 3 bits |

*FIG. 6B*

| Bit field | Interpretation |
|---|---|
| 0 | Frequency selective scheduling decision as per UE recommendation is not confirmed -> also means implicitly that CSI - RS resources to be used as a reference is as set in a preconfigured default configuration |
| 1 | Confirmation of frequency selective scheduling decision as per UE recommendation -> also means implicitly that CSI - RS resources to be used as a reference follow the latest CSI feedback report transmitted by the UE. |

FIG. 6C

| Bit field | Interpretation |
|---|---|
| 0 | Rate matching as per UE recommendation is not confirmed -> also means implicitly that CSI - RS resources to be used as a reference is as set in a preconfigured default configuration |
| 1 | Confirmation of rate - matching decision as per UE recommendation -> also means implicitly that CSI - RS resources to be used as a reference follow the latest CSI feedback report transmitted by the UE. |

FIG. 6D

METHODS, APPARATUS AND COMPUTER PROGRAMS FOR CONFIGURING USER EQUIPMENT

TECHNICAL FIELD

The present invention relates to methods, apparatus and computer programs for configuring a user equipment in a cellular wireless network.

BACKGROUND

Cellular wireless networks typically comprise wireless devices, including user equipment (UE) such as mobile handsets, etc., which may communicate via a network interface in the wireless device comprising a radio transceiver to a network of base stations connected to a telecommunications network. Such cellular wireless networks have undergone rapid development through a number of generations of radio access technology. The initial deployment of systems using analogue modulation has been superseded by second generation (2G) digital systems such as GSM (Global System for Mobile communications), and these systems have themselves been replaced by or augmented by third generation (3G) digital systems such as UMTS (Universal Mobile Telecommunications System), implementing the UTRAN (Universal Terrestrial Radio Access Network) radio access networks. Third generation standards provide for a greater throughput of data than is provided by second generation systems; this trend is continued with the introduction of Long Term Evolution (LTE) and LTE Advanced systems. Technical specifications for advanced cellular wireless networks are produced by Technical Specification Groups (TSGs) of the 3rd Generation Partnership Project (3GPP).

A trend in the development of advanced cellular wireless networks is the increasing use of distributed antenna systems. For example, advanced technical standards for LTE systems (e.g. LTE Release (Rel)-11 and above) have specifications relating to Multiple Input Multiple Output (MIMO) and coordinated multi-point transmission (CoMP) technologies. Both single-user (SU-) MIMO and multi-user (MU-) MIMO technologies are considered. As well as CoMP technologies there are also options for single or multi-point non-coordinated transmissions. It is envisaged that these technologies will be deployed in both homogeneous and heterogeneous network configurations.

For example, in a case of single point transmission, there may be configurations such as: a homogeneous macro network or a heterogeneous network of macro-sectors with four low power nodes (LPNs) and no coordination. The latter configuration may involve the macro sectors and the LPNs operating on the same or different frequency bands, such as one of the two operating on a higher and/or adjacent frequency band. In the case of multi-point transmission, there may be configurations such as: a homogeneous macro network with intra-site coordination; a homogeneous macro network with high power remote radio heads (RRH); or a heterogeneous network of macro-sectors with four LPNs. In the latter configuration, the LPNs may operate with or without the same cell ID.

A network deployment of a distributed antenna system may thus comprise a plurality of transmission points (TP). Each transmission point has its own antenna configuration. This antenna configuration may vary in terms of, for example, the number and type of antennas that are used. For instance, cross-polarized (XP) antennas or uniform linear arrays (ULA) may be used, with either close (e.g. $\lambda/2$—half wavelength) or large (e.g. $4\lambda$—four times wavelength) separation between elements.

In the field of radio access network (RAN) technologies there is thus a challenge to manage distributed antenna systems that may have a wide range of configuration options. For example, a transmission point may comprise multiple antenna ports and there may be a number of geographically-distributed transmission points.

The 3GPP TGS RAN working group dealing with technical specifications for the physical layer (layer 1 in the Open Systems Interconnection (OSI) model), WG1, has discussed antenna port mappings for geographically separated antennas (see, for example, R1-113610, the "Liaison Statement on Antenna Port Mapping onto Geographically Separated Antennas", 3GPP TSG RAN WG1 Meeting #66bis, Zhuhai, China, Oct. 10-14, 2011). This discussion was prompted by an earlier discussion (R1-111330, "Considerations on Real-Life DL MIMO Aspects", Ericsson, ST-Ericsson, 3GPP TSG-RAN WG1 #64, Barcelona, Spain, May 9-13, 2011) that considered the accuracy of UE transmission rank reporting, wherein a transmission rank denotes the number of layers that should preferably be used for downlink transmission to the UE, "layers" in this case relating to a transmission coding abstraction that is mapped to one or more antenna ports. In particular implementations, the UE selects or recommends a rank for use which is reported to a base station such as an eNodeB. Transmissions, e.g. from the base station, are then made based on the selected or recommended rank; for example, when rank 1 is reported, a corresponding transmission uses a single spatial layer (or a single stream), that can be mapped onto one or more antennas via spatial precoding and when rank 2 is reported, a corresponding transmission uses two spatial layers (or a dual stream), that can be mapped onto two or more antennas via spatial precoding.

In the earlier discussion it was found that there may be problems for a UE when it receives signals from antenna ports with a large imbalance in received power; for example, rank 2 may be reported even in cases where rank 1 is more efficient. This large imbalance may be due, for example, to geographical separation of the antenna ports. However, the results presented in this earlier discussion may not apply to all implementations. For example, in certain UE implementations, such as the real-world experimental results presented in technical document R1-113178, "Real-life measurements on rank adaptation", Renesas Mobile Europe Ltd, 3GPP TSG RAN WG1 Meeting #66bis, Zhuhai, China, Oct. 10-14, 2011) it has been shown that transmission rank adaptations could be accommodated in scenarios having large power imbalances.

In the latter discussion on antenna port mappings for geographically separated antennas, it was discussed how UE implementations should not assume geographical co-location for different antenna ports of a given cell, a cell being a spatial area served by a particular base station, or in general dependence among antenna ports. For example, it is assumed that there is flexibility with respect to mapping different antenna ports of a cell to different geographically separated antennas or transmission points. In particular, geographical co-location may not be assumed for, e.g., antenna ports transmitting cell-specific reference signals (CRS), UE-specific demodulation reference signals (DM-RS), and channel-state information (CSI) reference signals (CSI-RS). Deployments with LPNs or RRHs typically assume that the corresponding transmission points are geographically non-co-located. Technical specifications drawn up for the RAN in LTE rely on the independence of different antenna ports for precoding procedures with the mapping from antenna ports to antennas being transparent to the UE.

The issues discussed above were considered in follow-up discussions in the 3GPP TGS RAN working group for radio performance protocol aspects, WG4. In a Liaison Statement in reply to the "Liaison Statement on Antenna Port Mapping onto Geographically Separated Antennas" (see R4-121116, "Liaison Statement on Geographically separated antenna and impact on CSI estimation", 3GPP TSG-RAN WG4 Meeting #62, Dresden, Germany, Feb. 6-10, 2012), the possibility of introducing new tests to be performed by the UE to verify that no assumption on antenna port co-location is made by the UE was raised. In the reply, the working group expressed concerns about the complexity of evaluating antenna port co-location assumptions for reference signal configurations and required further feedback on the issue. In particular, further investigation was required in at least the following areas: whether any reference signal ports may be assumed as co-located or not; and the most relevant scenarios in terms of antenna ports deployment and power imbalance which need to be considered. The working group also raised the issues of performance degradation and increased UE complexity, which may occur for certain legacy UE implementations that assume arbitrary antenna port co-location.

There are thus numerous outstanding issues for the deployment of a distributed antenna system. In particular, if it can be assumed that antenna ports may be arbitrarily co-located, which is desired for flexible network configurations, there are problems that must be overcome for efficient operation of a wide range of UEs.

SUMMARY

In accordance with a first aspect of the present invention, there is provided a method for configuring a user equipment in a cellular wireless network, the method comprising:

receiving, at the user equipment, control information regarding one or more of a plurality of channel-state information (CSI) reference signals, said one or more of the plurality of CSI reference signals being receivable by the user equipment from one or more of a plurality of antenna ports that form part of the cellular wireless network, the plurality of CSI reference signals being associated with corresponding antenna ports, the control information being for use in configuration of the user equipment and being received over a radio communications downlink from a node in the cellular wireless network; and configuring, at the user equipment, estimation of one or more radio communication channels based on the received control information.

In this aspect, there is an advantage that control information regarding one or more of a plurality of CSI reference signals enables configuration of channel estimation at the user equipment to take into account different distributed antenna arrangements. By providing control information about CSI reference signals, rather than other reference signals such as demodulation (DM) reference signals or CRS reference signals, there is a reduced implementation overhead as CSI reference signals have a significantly lower time/frequency density. In an embodiment, the control information indicates which of the plurality of CSI reference signals are to be used as a reference signal set for use in configuration of the user equipment, i.e. using the reference signal set to obtain channel statistics, that are themselves used to estimate channel characteristics for a demodulation process that uses DM reference signals. For example, in particular circumstances, if two antenna ports are geographically separated and each transmits a CSI reference signal, the control information may indicate that the CSI reference signal for a closest antenna port should be used. In other cases, a different set of antenna ports may be signalled. This may have an advantage of improving data throughput for a receiving device. Another advantage is that a cellular wireless network can automatically configure itself to use particular reference signals and the signalled control information provides a way to do this.

In an embodiment, the control information indicates one of: a CSI reference signal resource to be used as a reference signal set, a CSI reference signal resource comprising a subset of the plurality CSI reference signals from the antenna ports; a subset of CSI reference signal resources to be used as a reference signal set; or a confirmation that a CSI feedback report from the user equipment is to be used to select a subset of CSI reference signal resources to be used as a reference signal set. Selecting a particular CSI reference signal resource from a number of CSI reference signal resources, allows configuration of the UE to be tailored to different antenna distributions, e.g. distributed transmission points and/or antenna ports. The control information may apply to all DM reference signal ports or may apply per DM reference signal port, the DM reference signal ports comprising antenna ports that are potentially different from the antenna ports for the CSI reference signals. For example, this may be the case because DM reference signals are spatially precoded; as such DM-RS ports may be logical ports that can result from the contribution of signals from multiple transmission points. CSI reference signals, on the other hand, are typically specific to a particular transmission point. In the latter case above, wherein the control information comprises confirmation that a CSI feedback report is to be used, a cellular wireless network is able to select a CSI reference to be signalled based on UE feedback.

In an embodiment, the method comprises allocating, for the user equipment, resources for physical downlink shared channel communications based on the control information. In this case, the way in which data is received and processed at the UE is influenced by the control information for the CSI reference signals. For example, an eNodeB may allocate a PDSCH channel and a UE may configure its internal processes and memory accordingly.

In an embodiment, the configuring comprises:

obtaining, at the user equipment, one or more channel statistics based on said one or more of the plurality of CSI reference signals indicated in the control information;

initiating, at the user equipment, one or more receiver modules using the obtained one or more channel statistics; and obtaining, using the initiated one or more receiver modules, estimates of one or more channel characteristics using DM reference signals.

In certain cases there may be the further step of demodulating, at the user equipment, data transmitted over a physical downlink shared channel using the obtained estimates of the said one or more channel characteristics.

In an embodiment, the control information provides co-location information for the plurality of antenna ports. This may be provided as well as, or instead of, information indicating which of the plurality of CSI reference signals are to be used as a reference signal set for use in configuration of the user equipment. In certain cases, whether particular antenna ports are co-located influences which of the plurality of CSI reference signals are used as a reference signal set. The control information may indicate, for one or more subsets of the plurality of antenna ports that are transmitting CSI reference signals, whether one or more antenna ports within a subset are co-located. This may be achieved by receiving indices of co-located antenna ports. In this case, the UE has knowledge concerning which antenna ports are co-located, which may be used to configure reception, for example, to configure appropriate channel characteristics as for the previously described embodiment. By sending this information to the UE, there is no need for the UE to make any assumption regarding co-location, which avoids the issues found when deploying distributed antenna systems. Knowing that certain antenna ports are co-located allows for better estimation of associated channel characteristics because of the increased number of samples that are available, e.g. reference symbols that are received from co-located antenna ports may be combined to determine a channel statistic. Another advantage is that blind detection of antenna (co-) location may be avoided, i.e. the UE need not independently interrogate each set of antenna ports to determine if they are co-located.

In an embodiment, the control information is delivered semi-statically using a control-plane protocol. In another embodiment, the control information is delivered dynamically using a downlink control channel. The control information may relate to one or more subband frequency communication channels or a wideband frequency communication channel. It may comprise one or more fields of one or more bits. Channel statistics may be at least one of: timing information; a delay spread; a Doppler spread; a frequency offset; a signal-to-interference ratio; and an interference covariance matrix.

In an embodiment, the method comprises obtaining channel statistics based on the control information; and one or more of demodulating data transmitted over the one or more radio communication channels using channel characteristics estimated, for example, using receiver modules initialised with the obtained channel statistics; and providing CSI feedback using the estimated channel statistics.

In an embodiment the control information may be signalled explicitly or implicitly.

In accordance with a second aspect of the present invention, there is provided a method of transmitting control information to a user equipment in a cellular wireless network, the method comprising:

transmitting, from a node in the cellular wireless network to the user equipment over a radio communications downlink, control information regarding one or more of the plurality of channel-state information (CSI) reference signals, the cellular wireless network comprising a plurality of antenna ports for use in at least transmission, the user equipment being arranged to receive said one or more of the plurality of CSI reference signals from said antenna ports, the plurality of CSI reference signals being associated with corresponding antenna ports, the control information being for use, by the user equipment, in estimating one or more radio communication channels.

The second aspect provides similar advantages to the first aspect but from the perspective of the network equipment rather than the user equipment. For example, a network operator could see benefits in data throughput to attached devices. Modifications and optional features corresponding to those of the first aspect described above may be applied to the second aspect, with similar advantages.

In an embodiment, the method comprises transmitting, from one or more transmission points each comprising one or more of the plurality of antenna ports, data to the user equipment for demodulation based on channel characteristics estimated based on the transmitted control information.

In accordance with a third aspect of the present invention, there is provided apparatus comprising a processing system for a user equipment for use in a cellular wireless network, the processing system being constructed and arranged to cause the user equipment to:

receive one or more of a plurality of channel-state information (CSI) reference signals from one or more of a plurality of antenna ports that form part of the cellular wireless network, the plurality of CSI reference signals being associated with corresponding antenna ports;

receive control information regarding one or more of the plurality of CSI reference signals, the control information being for use in configuration of the user equipment and being received over a radio communications downlink from a node in the cellular wireless network; and configure estimation of one or more radio communication channels based on the received control information.

This apparatus has advantages similar to those described with regard to the first aspect. Modifications corresponding to those set out above for the first aspect may be applied to the third aspect, with similar advantages.

The processing system described above may comprise at least one processor; and at least one memory including computer program instructions; the at least one memory and the computer program instructions being configured to, with the at least one processor, cause the apparatus at least to perform as described above.

In accordance with a fourth aspect of the present invention, there is provided apparatus for transmitting to a user equipment in a cellular wireless network, the apparatus constructed and arranged to:

transmit to the user equipment over a radio communications downlink control information regarding one or more of a plurality of channel-state information (CSI) reference signals, the cellular wireless network comprising a plurality of antenna ports for use in at least transmission, the plurality of CSI reference signals being associated with corresponding antenna ports, the control information being for use, by the user equipment, in estimating one or more radio communication channels.

This apparatus has advantages similar to those described with regard to the second aspect. Modifications corresponding to those set out above for the second aspect may be applied to the fourth aspect, with similar advantages.

In accordance with a fifth aspect of the present invention, there is provided a computer program comprising instructions executable by a processing system of a user equipment to cause the user equipment to perform a method for configuring the user equipment in a cellular wireless network, the method comprising:

receiving, at the user equipment, control information regarding one or more of a plurality of channel-state information (CSI) reference signals, said one or more of the plurality of CSI reference signals being receivable by the user equipment from one or more of a plurality of antenna ports that form part of the cellular wireless network, the plurality of CSI reference signals being associated with corresponding antenna ports, the control information being for use in configuration of the user equipment and being received over a radio communications downlink from a node in the cellular wireless network; and configuring, at the user equipment, estimation of one or more radio communication channels based on the received control information.

The fifth aspect may have embodiments that reflect the embodiments of the first aspect.

There may be provided a computer program product comprising a non-transitory computer-readable storage medium having computer readable instructions stored thereon, the computer readable instructions being executable by a computerised device to cause the computerised device to perform as described above.

Further features and advantages of the invention will become apparent from the following description of preferred embodiments of the invention, given by way of example only, which is made with reference to the accompanying drawings.

BRIEF DESCRIPTION OF THE DRAWINGS

FIG. 6A is a first table showing exemplary control information according to an embodiment of the present invention;

FIG. 6B is a second table showing exemplary control information according to an embodiment of the present invention;

FIG. 6C is a third table showing exemplary control information according to an embodiment of the present invention;

FIG. 6D is a fourth table showing exemplary control information according to an embodiment of the present invention.

DETAILED DESCRIPTION

"Wireless devices" include in general any device capable of connecting wirelessly to a network, and includes in particular mobile devices including mobile or cell phones (including so-called "smart phones"), personal digital assistants, pagers, tablet and laptop computers, content-consumption or generation devices (for music and/or video for example), data cards, USB dongles, etc., as well as fixed or more static devices, such as personal computers, game consoles and other generally static entertainment devices, various other domestic and non-domestic machines and devices, etc. The term "user equipment" or UE is often used to refer to wireless devices in general, and particularly mobile wireless devices.

Reference will sometimes be made in this specification to "network", "network control apparatus" and "base station". In this respect, it will be understood that the "network control apparatus" is the overall apparatus that provides for general management and control of the network and connected devices. Such apparatus may in practice be constituted by several discrete pieces of equipment. As a particular example in the context of UMTS (Universal Mobile Telecommunications System), the network control apparatus may be constituted by for example a so-called Radio Network Controller operating in conjunction with one or more Node Bs (which, in many respects, can be regarded as "base stations"). As another example, LTE (Long Term Evolution) makes use of a so-called Evolved Node B (eNB) where the RF transceiver and resource management/control functions are combined into a single entity. The term "base station" is used in this specification to include a "traditional" base station, a Node B, an evolved Node B (eNB), or any other access point to a network, unless the context requires otherwise. Moreover for convenience and by convention, the terms "network control apparatus" and "base station" will often be used interchangeably.

Figure 1:
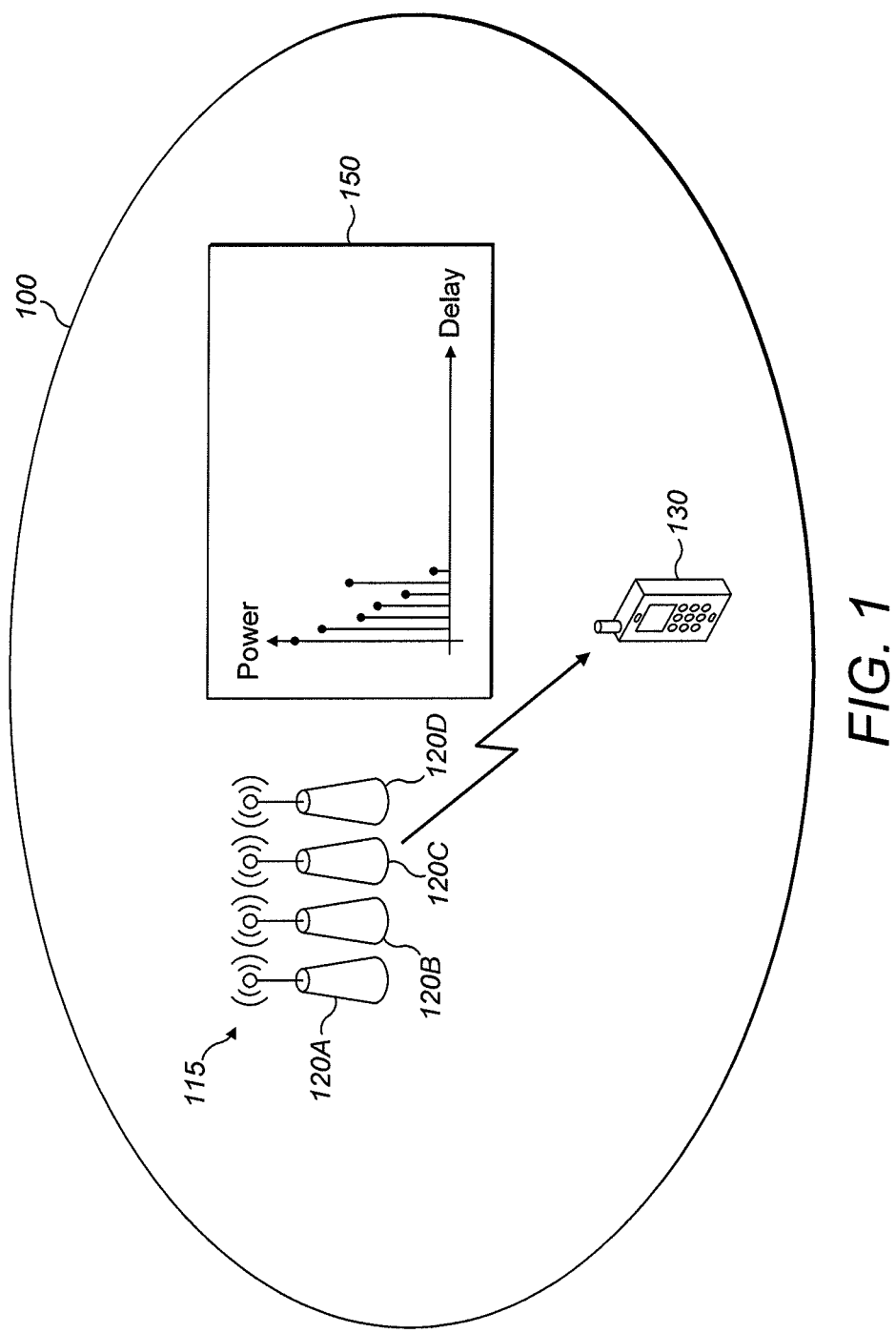
FIG. 1 is a schematic diagram showing a UE receiving signals from a first transmission point comprising four co-located antenna ports.

FIG. 1 is a schematic diagram showing a cell 100 of a cellular wireless network that comprises a first transmission point 115 comprising a first set of four co-located antenna ports 120. The first transmission point 115 is located a first distance from a UE 130. The UE 130 receives signals from the antenna ports 120 of the first transmission point 115. The UE 130 is also time synchronised to the first transmission point 115. A power delay profile of a radio communications channel set up between the first transmission point 115 and the UE 130, e.g. for transmission of data to the UE, is shown in a first chart 150. Certain versions of the LTE technical specification implicitly assume that all antenna ports belonging to a transmission point are co-located, as illustrated in FIG. 1.

Figure 2:
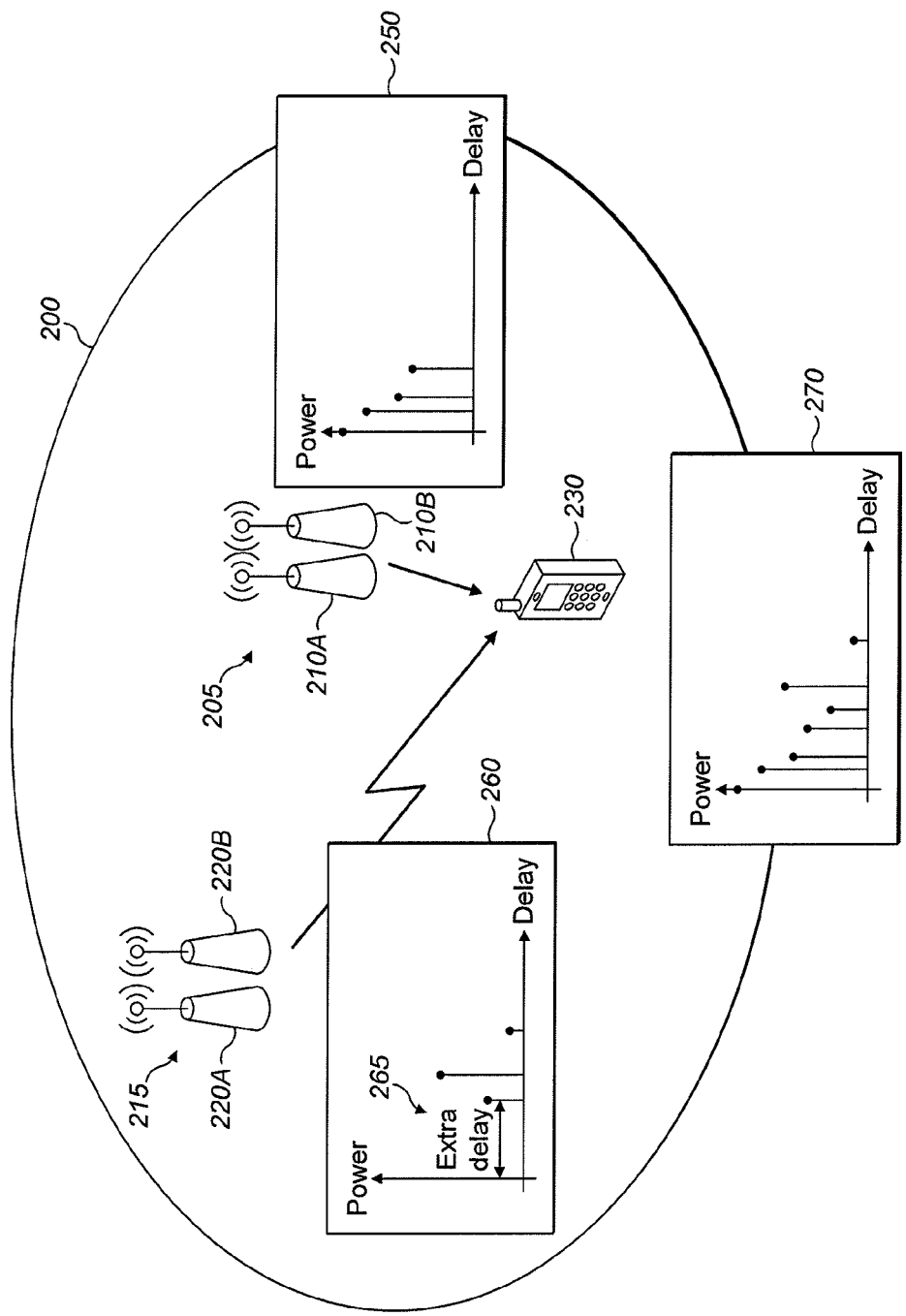
FIG. 2 is a schematic diagram showing a UE receiving signals from a two different transmission points, each comprising two co-located antenna ports.

FIG. 2 is a schematic diagram showing a cell 200 of a cellular wireless network that comprises a second transmission point 205 comprising a second set of two co-located antenna ports 210 and a third transmission point 215 comprising a third set of two co-located antenna ports 220. The second transmission point 205 is located at a second distance from a UE 230 and the third transmission point 215 is located at a third distance from the UE 230, wherein the third distance is greater than the second distance, i.e. the antenna ports 210 are geographically spaced or separated from the antenna ports 220. The UE 130 receives signals from both sets of antenna ports 210, 220, i.e. from both the second and third transmission points 205, 215. The UE 230 is time synchronised to the second transmission point 205. As such, signals received by the UE 230 from the third transmission point 215 experience an extra delay. This is illustrated in the power delay profiles. A power delay profile of a radio communications channel set up between the second transmission point 205 and the UE 230, e.g. for transmission of data to the UE, is shown in a second chart 250. As can be seen from the second chart 250, the range of delay values is narrow. A power delay profile of a radio communications channel set up between the third transmission point 215 and the UE 230, e.g. for transmission of data to the UE, is shown in a third chart 260. As can be seen from the third chart 260, there is an extra delay period 265 and the radio communications channel experiences greater total delay spread as compared to the radio communications channel set up between the second transmission point 205 and the UE 230. This extra delay period 265 reflects the additional time it takes for radio signals to travel the distance between the third transmission point 215 and the UE 230. As a result, the radio communications channel experienced from the second transmission point 205 will typically be less frequency selective compared to the one experienced from the third transmission point 215. A power delay profile of a composite or aggregated radio communications channel that combines the radio communications channels set up between the second and third transmission points 205, 215 and the UE 230 is shown in a fourth chart 270. This would be the case when both the second and third transmission points 205, 215 are used to transmit jointly to the UE 230. Generally, the fourth chart 270 and the first chart 150 will differ for most implementations; any similarities in the described Figures are due to the schematic nature of the drawings.

In LTE systems, the mapping of antenna ports to physical antennas is typically left to specific network implementations and deployments. For example, in FIG. 2 the mapping of antenna ports 210, 220 to transmission points 205, 215 may be hardcoded in the specific network deployment shown in FIG. 2. In such systems, it is assumed that certain antenna ports are co-located, i.e. are located proximate to each other in physical space. For example, in conventional LTE systems (e.g. up to LTE Rel-10), it is assumed that all antenna ports that transmit cell-specific reference signals (referred to as "CRS ports") within one cell are co-located and that all antenna ports that transmit channel-state information reference signals (referred to as "CSI-RS ports") are co-located with the CRS ports and antenna ports that transmit demodulation reference signals (referred to as "DM-RS ports"). If these assumptions are not made, the issues discussed above could arise and degrade network performance; for example, may lead to issues related to transmission rank and/or reference signal received power (RSRP) reporting.

In conventional LTE systems, including up to LTE Rel-10, typical UE implementations estimate a first set of statistics required for CSI-RS or DM-RS channel estimation from CRS. Then, corresponding channel estimates using CSI-RS are used for CSI, e.g. for calculation of Channel Quality Information (CQI), a Precoding Matrix Index (PMI) and/or Rank Indication (RI). These CSI components may be fed back over an uplink feedback channel. Channel estimates are then calculated for use in UE data demodulation using DM-RS. The following channel statistics are typically estimated from reference signals (RS), e.g. one or more of CRS, CSI-RS or DM-RS:

Delay spread of the channel (and/or equivalently frequency correlation properties);
Doppler spread of the channel (and/or equivalently time correlation properties);
Time and frequency tracking (and/or fine time and frequency synchronization); and
Signal-to-interference-and-noise ratio (SINR) and/or more generally interference covariance matrix for CSI feedback as well as demodulation.

Channel statistics, such as those set out above allow the UE to parameterise, i.e. supply parameter values for, a channel estimator that forms part of a receiver module of the UE. For example, the channel statistics may be used to provide and/or derive channel estimation filter coefficients for a channel estimation filter that match as closely as possible the power-delay and Doppler profiles of the channel impulse response of the communications channel to be estimated. A channel estimation filter may then be used to estimate channel characteristics. As another example, time and frequency tracking is based on statistics derived from reference symbols and a set of estimated fine time and frequency synchronization parameters may be taken into account when deriving CSI feedback or when performing data demodulation. As a further example, an accurate estimation of the SINR is important for setting optimal mean square error (MSE) filter parameters so as to provide optimum filtering performance.

As described above, in certain LTE systems, there is an assumption that CRS, CSI-RS and DM-RS ports are mapped to a physically, i.e. geographically, co-located antenna or transmission point within a cell. This is suitable for deployments such as that shown in FIG. 1, wherein a cell comprises a plurality of antenna ports 120 that are all (co-) located at a single transmission point 115 for the cell. In this case, as all antenna ports for a cell are co-located, they will experience similar channel conditions in terms of a power-delay profile, timing and SINR conditions. However, issues arise in systems with distributed antenna deployments.

For example, in CoMP and further enhanced inter-cell interference coordination (feICIC) systems, a UE may receive reference symbols from non co-located antenna ports. In the case of CoMP, UE needs to perform CSI feedback as well as demodulation based on DM-RS. This may need to occur over geographically non-co-located antennas. CoMP transmission schemes are designed to be transparent to UE. This is achieved using DM-RS for data demodulation at the UE. However, when using a dynamic point selection scheme in a CoMP system, one or more antenna ports serving a UE may change on a frequency subband and time basis. In this case, there are difficulties which timing information is to be used for DM-RS demodulation and where to derive such timing, as well as which channel profile to assume for DM-RS demodulation. In the case of feICIC, a UE will need in turn to cancel CRS symbols from, for example, antenna ports in another cell that are behaving as a dominant interferer. In this situation, time and frequency tracking of CRS symbols from a dominant interferer is important.

Explained in the context of FIG. 2, in the cell 200 certain reference symbols may be received from antenna ports 210 belonging to the second transmission point 205 and other reference symbols may be received from antenna ports 220 belonging to the third transmission point 215. As these antenna ports are physically, i.e. geographically, separated a number of problems can arise.

A first problem is that of an additional propagation delay. This is illustrated in the third chart 260 of FIG. 2. In this case, timings, for example for a Fast Fourier Transform (FFT), is synchronised to the antenna ports 210 belonging to the second transmission point 205. These timings may be based on CRS obtained from the antenna ports 210 belonging to the second transmission point 205. However, this can introduce errors when performing calculations relating to data and/or other reference symbols received from antenna ports 220 belonging to the third transmission point 215. This is illustrated in FIGS. 3A to 3C.

Figure 3A:
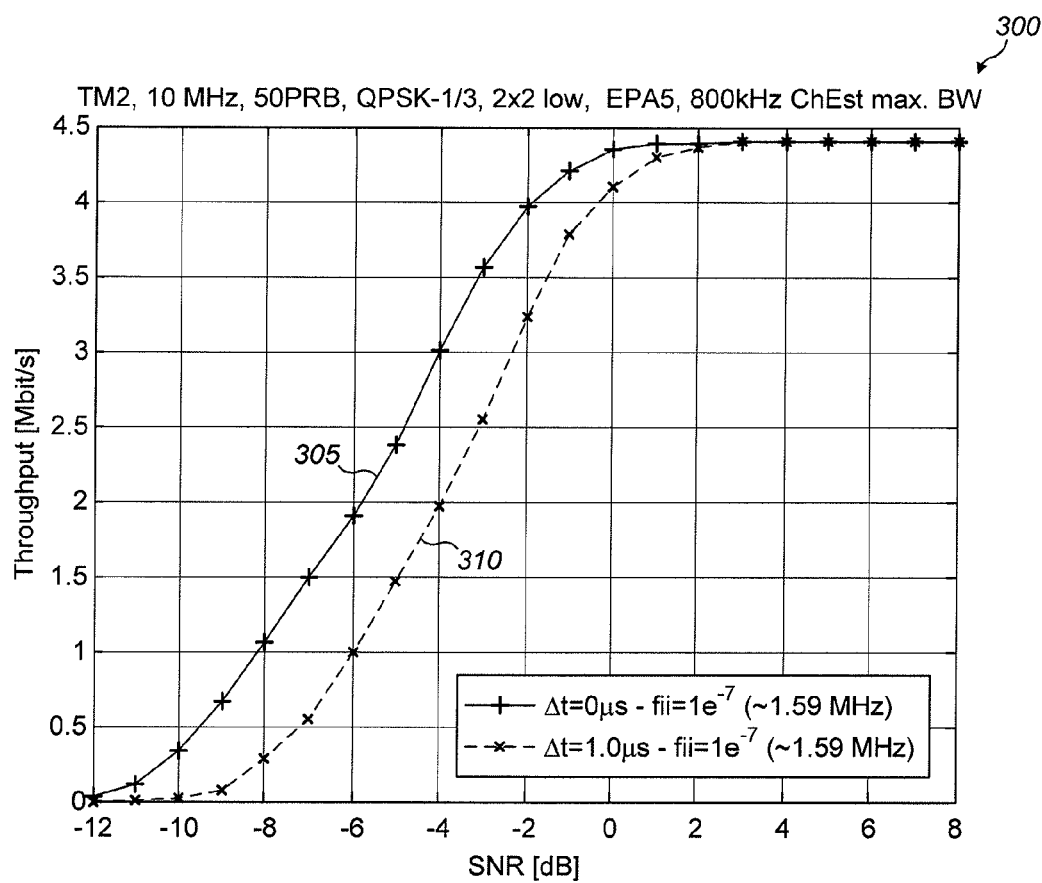
FIG. 3A is a chart showing data throughput versus signal-to-noise ratio (SNR) for a first set of signals and a second, delayed, set of signals that use a Quadrature Phase-Shift Keying (QPSK) coding scheme with channel coding rate equal to one third (⅓)
Figure 3B:
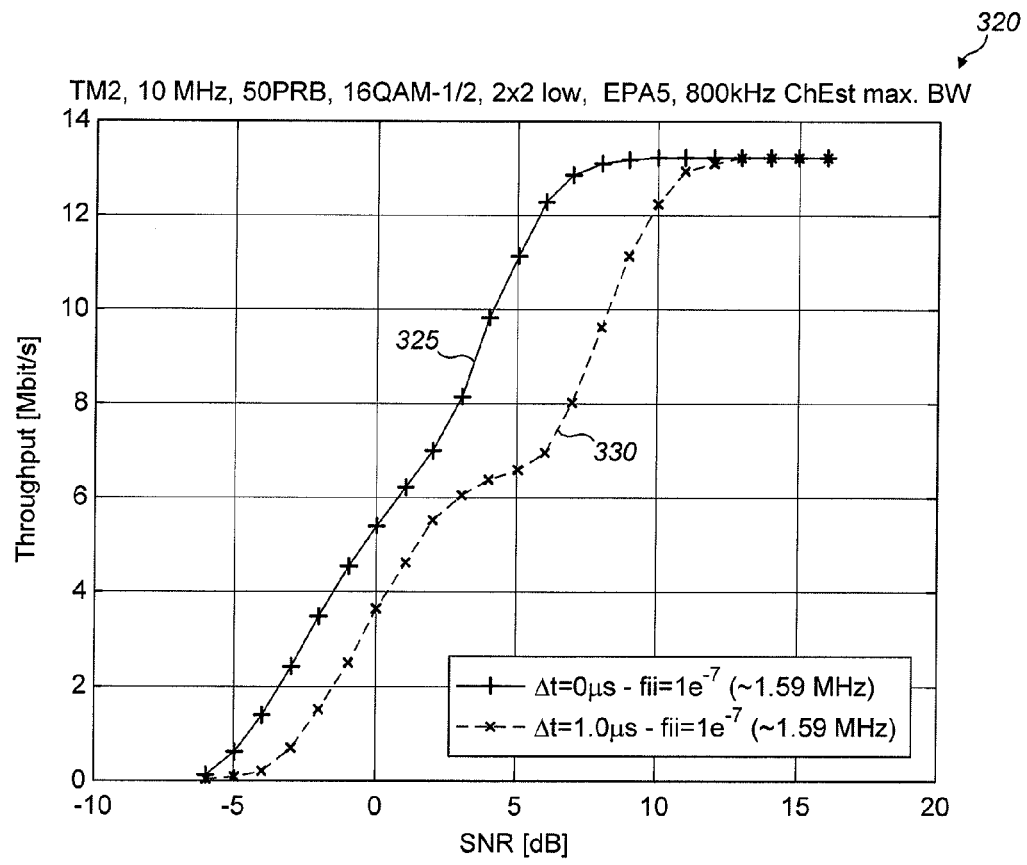
FIG. 3B is a chart showing data throughput versus SNR for a first set of signals and a second, delayed, set of signals that use a Quadrature Amplitude Modulation coding scheme with 16 quantised levels (QAM-16) scheme with channel coding rate equal to one half (½)
Figure 3C:
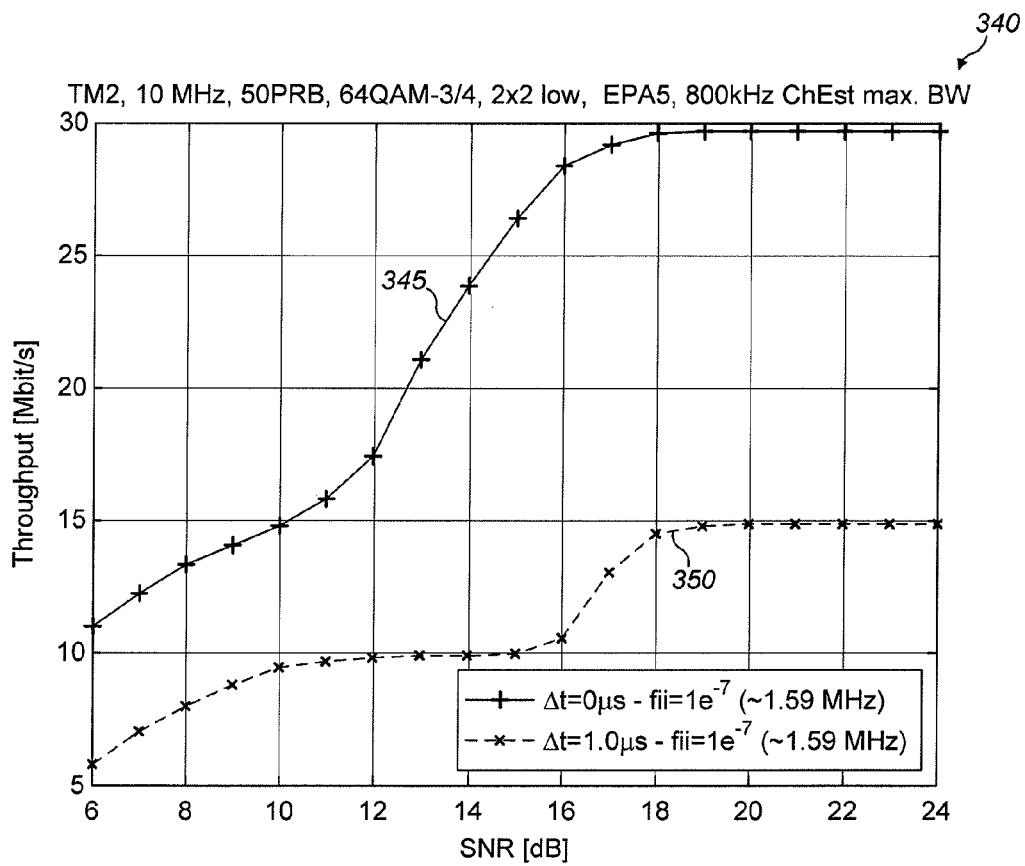
FIG. 3C is a chart showing data throughput versus SNR for a first set of signals and a second, delayed, set of signals that use a Quadrature Amplitude Modulation coding scheme with 64 quantised levels (QAM-64) scheme with channel coding rate equal to three quarters (¾)

FIGS. 3A to 3C show throughput performance of a Physical Downlink Shared Channel (PSDCH) in transmission mode 2 (TM2) for 2×2 uncorrelated antenna configurations for three respective modulation and coding schemes (MCS), QPSK-⅓, 16 QAM-½ and 64 QAM-¾, under extended pedestrian-A (EPA) propagation conditions at 2.7 km/h UE velocity (5 Hz Doppler spread at 2.0 GHz carrier frequency). Hybrid Automatic Repeat reQuest (HARQ) is enabled with up to four transmissions. The EPA channel is almost flat in frequency (i.e. mostly frequency non selective) with a coherence bandwidth $B_c$ of approximately 3.69 MHz. The coherence bandwidth is a statistical measurement of the range of frequencies over which the channel can be considered "flat", or in other words the approximate maximum bandwidth or frequency interval over which two frequencies of a signal are likely to experience comparable or correlated fading (e.g. in phase and/or amplitude). Curves 305, 325 and 345 comprise a first set of signals modelled for each respective MCS. The first set of signals experience no additional propagation delay compared to an FFT timing, i.e. Δt (delta t)=0. The first set of signals are assumed to be received based on a channel estimator bandwidth, i.e. a bandwidth channel estimation parameter for a channel estimator forming part of a receiver module, tuned to the coherence bandwidth $B_c$ of the channel. In the case of FIGS. 3A to 3C, the bandwidth channel estimation parameter 'fii' for curves 305, 325 and 345 is $1e^{-7}$, which translates to a $B_c$ value of ~1.59 MHz. This translates to a best channel estimation performance since channel interpolation processes reference symbols (CRS in this case) over a wide bandwidth. Through these examples, the parameter 'fii' governs here the particular tuning of the channel estimator to the channel statistics, assuming an exponential power delay profile in this particular case: $B_c$ is estimated as here as $B_c \approx 1/(2 \times 3.14159 \times fii)$ or equivalently $fii \approx 1/(2 \times 3.14159 \times B_c)$.

Curves 310, 330 and 350 correspond to a second set of signals that experience an additional propagation delay. For example, if the first set of signals were received from antenna ports 210 belonging to the second transmission point 205 the second set of signals may correspond to signals received from antenna ports 220 belonging to the third transmission point 215. The second set of signals is modelled as experiencing an additional propagation delay of 1 microsecond (1 μs) compared to a FFT timing. For instance, a 300 meter (300 m) difference in the associated propagation paths associated with the second and third transmission points 205, 215 would introduce a 1 μs additional propagation delay. The second set of signals are assumed to be received based on a channel estimator bandwidth tuned to same coherence bandwidth $B_c$ as the first set of signals, i.e. the bandwidth channel estimation parameter 'fii' for curves 310, 330 and 350 is $1e^{-7}$, which translates to a $B_c$ value of ~1.59 MHz. In the example of FIG. 2, this would be the case if the bandwidth channel estimation parameter for the second set of signals, i.e. signals received from antenna ports 220 belonging to the third transmission point 215, was derived using reference signals received from antenna ports 210 belonging to the second transmission point 205.

As can be seen from curves 310, 330 and 350 of respective FIGS. 3A, 3B and 3C, an additional propagation delay can result in a significant loss in throughput performance, especially for high order modulations. A reason for the significant loss in throughput performance is that, even though the frequencies of the second set of signals are within the cyclic prefix (CP), i.e. the cellular wireless network is insensitive to the additional time delay for Orthogonal Frequency-Division Multiplexing (OFDM) signal, the additional propagation translates to a phase modulation in the frequency domain which renders the associated channel artificially more frequency selective. In the case of FIGS. 3A to 3C the channel phase selectivity corresponds approximately to a coherence bandwidth of 160 kHz, rather than the assumed bandwidth value of 1.59 MHz. This in turn degrades channel estimation performance if timing correction is not applied prior to channel estimation or the channel estimation bandwidth is not reduced. Certain examples of embodiments of the present invention are based on this observation.

A second problem that can arise with physically, i.e. geographically, separated antenna ports is that there is an additional frequency offset. For example, there may be an additional frequency offset with respect to a frequency reference if the frequency reference is derived from a particular set of reference signals, e.g. CRS, that are received from a particular set of antenna ports that differ from antenna ports used to receive subsequent data signals. This additional frequency offset may be due to different antenna ports having separate and/or non-synchronised oscillators.

A third problem is that different signals from separated antenna ports may experience different propagation conditions in addition to the additional propagation delay. For example, the different signals may require the use of a different channel model due to differences in the location of each set of antenna ports, e.g. an extended typical urban (ETU) model may be used for antenna ports associated with a macro cell and an EPA model may be used for antenna ports associated with a pico-cell or LPN.

Examples described herein that relate to embodiments of the present invention aim to address at least some of these problems. For example, they seek to avoid misconfigured channel estimators in UE and reduce the impact of distributed antenna systems on at least one of CSI feedback and UE demodulation performance. Certain examples avoid potential issues in terms of network performance and UE complexity in the case of arbitrary mappings of antenna ports to physical antenna within a cell. UE complexity may be reduced by utilising CSI reference signals for the estimation of channel statistics instead of relying on per-subband DM reference signals. These channel statistics may be used to estimate channel characteristics, for example by means of a channel estimator properly initialised in accordance with said channel statistics.

Certain examples comprise a method for signalling to UE information about which reference signal ports may be used as a reference for assessing channel statistics. In one example, the UE is signalled control information about which CSI-RS resource may be utilised as a reference for channel statistics required in DM-reference-signal-based demodulation. In the art, DM reference-signals are also sometimes equivalently referred to as UE-specific reference signals or dedicated reference signals, and they all denote UE-specific reference signals that are precoded. These signalling methods extend cellular wireless network configurations that operate using a transmission rank larger than 1, where each spatial layer is transmitted from geographically-separate, i.e. non-co-located, antenna ports and/or transmission points. Signalling may be explicit or implicit. In one example, the UE may assume that a reference resource for channel statistics required in DM-reference-signal-based demodulation is to be taken within the subset of CSI-RS reference resources configured for CSI feedback. Control information may apply per Physical Resource Block PRB or per precoding resource group (PRG). In one example, the UE is signalled information about which subsets of CSI-RS ports within one CSI-RS resource may be assumed co-located. This may be used by the UE when estimating the channel for CSI feedback reporting. Channel statistics may comprise at least one of timing information, a delay spread, a Doppler spread, a frequency offset, a signal-to-interference ratio, and an interference covariance matrix. In example, the control information detailing which reference signal antenna ports to use as reference for assessing channel statistics pertains to a given signalled frequency subband.

Figure 4A:
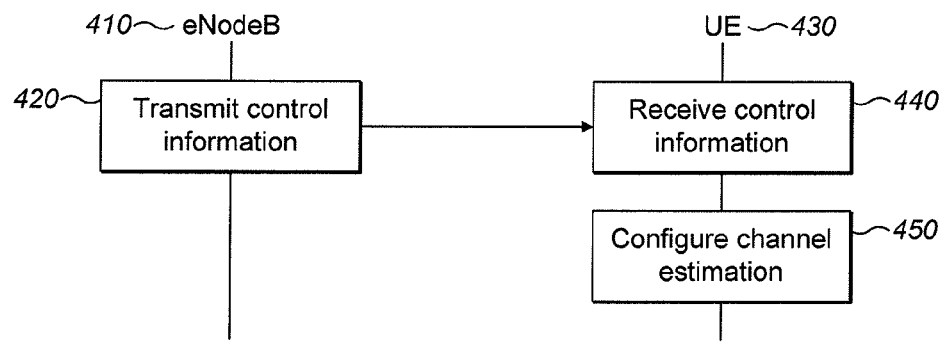
FIG. 4A is a sequence diagram showing an exemplary method for signalling control information according to an embodiment of the present invention.

FIG. 4A is a sequence diagram showing an exemplary method for signalling control information according to an embodiment of the present invention. FIG. 4A shows control information that is transmitted from a base station, in this case an eNodeB 410, to a UE 430. At step 420, the eNodeB 410 transmits the control information. This is received by the UE 430 at step 440. At step 450 the control information is used by the UE 430 to configure channel estimation.

In the examples of FIGS. 1 and 2 it may be that antenna ports within a cell are under control of a common entity, for example a base station or eNodeB. However, this may not always be the case. For example, multi-point transmission can take place to the UE from transmission points belonging to different cells; in this case a plurality of transmission points (each comprising one or more antenna ports) may be under control of different base stations or eNodeBs.

In a first example, the control information indicates which CSI-RS resources can be used as a reference for estimating channel statistics when doing demodulation based on UE-specific reference signals (such as DM-RS). In this context, a CSI-RS resource is a subset of antenna ports within a cell that transmit CSI reference signals, for example antenna ports that transmit CSI reference signals are part of an overall CSI-RS pattern that can be signalled to the UE. Antenna ports within a CSI-RS resource are preferably co-located.

In the first example, the control information may be dynamically or semi-statically signalled. A dynamic signalling scheme may comprise transmitting the control information as part of a downlink control information (DCI) format transmitted either over a Physical Downlink Control Channel (PDCCH) or an evolved PDCCH (ePDCCH). In such a scheme the control information may be signalled explicitly or implicitly. Explicit signalling may take the form of dedicated bit sequences that are transmitted to the UE. Implicit signalling may use a pre-existing bit sequence to indicate the control information, i.e. the UE derives the value of the control information from another data field transmitted to the UE. When a Dynamic Transmission-Point Selection (DPS) or CoMP scheme is being used, the pre-existing bit sequence may comprise either a confirmation bit for a frequency-selective scheduling decision or a confirmation bit for a rate matching decision. A semi-static signalling scheme may comprise transmitting control information to the UE via higher layer, i.e. a layer above the physical layer or layer 1 in the OSI model. For example, a semi-static signalling scheme may use Radio Resource Control (RRC) signalling.

Dynamic signalling is so-called because over PDCCH or ePDCCH it can, in principle, be provided on a Transmission Time Interval (TTI) basis (1 millisecond in LTE). In comparison, semi-statically signalling is so-called because higher layer signalling, e.g. RRC-based, operates at a slower rate (e.g in the order of at least tens or hundreds of milliseconds) and, since it incurs a higher overhead, conveys parameters that are typically not changed with a much lower frequency (i.e. not too often).

In an exemplary semi-static signalling scheme of the first example, a UE is supplied with control information over a higher layer signalling scheme. The control information indicates a particular CSI-RS resource from a group of CSI-RS resources that are to be used by the UE for configuring CSI feedback. The group may comprise configured CSI-RS resources for the UE. The CSI feedback may comprise part of CoMP measurement set signalling. This effectively specifies which antenna ports that are transmitting CSI reference signals are to be used as reference for UE configuration procedures, such as channel estimation for demodulation over, i.e. when using, DM-RS. For example, the control information may indicate a particular subset of antenna ports from which CSI reference signals are to be received, these CSI reference signals being used over CSI reference signals from other antenna ports within a cell to calculate channel statistics and thus estimate channel characteristics. In certain cases of the exemplary semi-static signalling scheme, the reference CSI-RS resource indicated in the control information is used for channel estimation over the whole frequency band of a radio communications channel (i.e. wideband channel estimation). In other cases of the exemplary semi-static signalling scheme, the control information may indicate a particular CSI-RS resource to use for one or more frequency subbands of a radio communications channel, where the UE may be informed of different CSI-RS resources to use as reference for channel statistics for different subbands.

In an exemplary dynamic signalling scheme of the first example, one or more bits are added into the DCI format transmitted over PDCCH/ePDCCH to indicate which of a number of configured CSI-RS resources should be utilised as reference for channel estimation procedures over DM-RS. The channel estimation procedures may involve the calculation of channel statistics using CSI reference signals received from one or more indicated CSI-RS resources. These channel statistics may be used to configure receiver modules such as channel estimators or other digital filter involved in channel estimation.

In certain cases, a UE calculates, or obtains over the air, channel statistics for a number of CSI-RS resources available to the UE. In these cases, the UE selects particular channel statistics calculated based on CSI reference signals from one or more CSI-RS resources indicated in the control information. As an example, the second transmission point 205 in FIG. 2 may be a first CSI-RS resource and the third transmission point 215 in FIG. 2 may be a second CSI-RS resource, wherein each CSI-RS resource respectively corresponds to antenna ports 210 and antenna ports 220. In this example, a UE may calculate channel statistics, such as those set out in the description above, for both CSI-RS resources. Control information may then be sent to the UE indicating that the first CSI-RS resource is to be used as reference for channel statistics estimation for DM-RS based demodulation. In that case, the UE selects the channel statistics associated with the first CSI-RS resource. These channel statistics then form the basis for channel estimation over DM-RS, e.g. may be used to determine parameters for a channel estimator or other digital filter.

In the exemplary dynamic signalling scheme of the first example, the control information received by the UE may indicate a CSI-RS resource to use to determine channel characteristics for each subband of a radio communications channel. As described above, channel statistics corresponding to each available CSI-RS resource may be available to the UE. As such the control information may provide an indication that is used to signal, for each subband, which of these sets of channel statistics is to be used to configure demodulation on each subband. For N subbands and two configured CSI-RS resources this requires N bits, i.e. each bit value indicates one or the other of the configured CSI-RS resources.

Alternatively, CSI feedback determinations performed by a UE may provide a recommendation for a particular set of antenna ports to be used in transmitting data to the UE together with DM-reference signals for demodulation. In this case, the control information may comprise a confirmation that a recommended set of antenna ports forming a CSI-RS resource determined by a UE are to be used as reference for channel statistics estimation for DM-RS channel estimation and demodulation. This confirmation may comprise a binary flag. CSI feedback for CoMP features a number of reports on a subband basis. These reports include per-transmission-point CSI reports (e.g. CQI/PMI/RI) and inter-transmission-point CSI reports. The latter reports may comprise transmission point selection components for a DPS scheme and/or inter-transmission point phase combiners for joint-processing CoMP (JP-CoMP). In these cases a recommended transmission point per subband (or alternatively over a whole frequency band or wideband) is set out in one or more of these reports, which are compiled by the UE. These reports and their recommended transmission points may be available to the UE for use in reference CSI-RS resource selection for computing channel statistics for DM-RS demodulation. For example, the recommended transmission point per subband (or alternatively over the whole frequency band or wideband) is also selected as the reference CSI-RS resource for computing channel statistics for use in DM-RS demodulation.

Figure 4B:
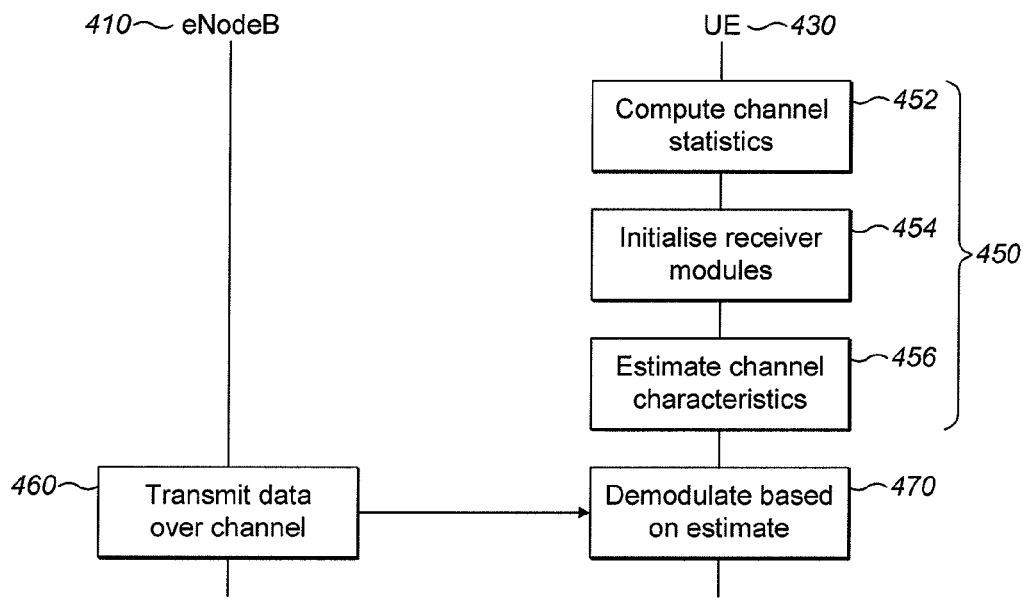
FIG. 4B is a sequence diagram showing an exemplary method for configuring a UE and transmitting and receiving data according to an embodiment of the present invention.

FIG. 4B is a sequence diagram showing an exemplary method for configuring a UE and transmitting and receiving data according to the first example. As with FIG. 4A there is an eNodeB 410 and a UE 430. FIG. 4B shows a number of steps that may comprise the step of configuring a channel estimation process 450. At step 452, the UE 430 computes a set of channel statistics. This set of channel statistics relates to the CSI-RS resource indicated in the control information received by the UE 430 at step 440 of FIG. 4A, i.e. in this example the channel statistics are computed based on CSI reference signals received from CSI antenna ports that form the indicated CSI-RS reference. In other examples, the set of channel statistics may be selected as a subset of a larger group of computed channel statistics; for example, a UE 430 may compute channel statistics based on CSI reference signals from all available CSI-RS antenna ports, which includes the indicated CSI-RS resource plus other CSI-RS resources that are not indicated in the control information. In these other examples, a particular subset of channel statistics relating to an indicated CSI-RS resource is selected based on the received control information. In another case, the UE 430 may obtain a set of channel statistics for an indicated CSI-RS resource in some other manner. The set of channel statistics may comprise, amongst others, at least one of: timing information; a delay spread; a Doppler spread; a frequency offset; a signal-to-interference ratio; and an interference covariance matrix.

At step 454, one or more receiver modules of the UE 430 are initialised. These receiver modules comprise one or more components that are used by the UE 430 to receive wireless signals and/or calibrate the UE 430 for data reception. In one case, the one or more receiver modules comprise a channel estimator for estimating channel characteristics, i.e. for estimating a channel, such as a matrix filter comprising a number of values that fit the properties of a radio communications channel, wherein said matrix filter is for the purpose of filtering, in an optimum sense, a set of reference symbols to obtain a channel estimate. The set of channel statistics relating to the indicated CSI-RS resource is then used to set the operating parameters of the channel estimator.

At step 456, a channel is estimated using the one or more receiver modules initialised at step 454. For example, a channel estimator filter computed at step 454 may be used to estimate a channel. In the first example, the channel estimator uses DM reference signals to estimate the channel characteristics, i.e. to obtain a channel estimate. In other examples, reference signals other than DM-reference signals may be used for this step. The one or more receive modules may also comprise one or more digital filters. These digital filters may, for example, by used in a signal processing path that includes the channel estimator. In this case the set of channel statistics relating to the indicated CSI-RS resource is used to determine appropriate filter coefficients for the one or more digital filters. At step 456, the UE 430 obtains channel estimates using DM reference signals using the receiver modules, e.g. the channel estimator and/or one or more digital filters respectively initialised with operating parameters that are based on the set of channel statistics relating to the CSI-RS resource indicated in the control information received in step 440 of FIG. 4A. In the present example, channel estimation is performed using DM reference signals received in PRBs allocated to a Physical Downlink Shared Channel (PDSCH).

Following the configuration of a channel estimation process, and channel estimation based on DM reference signals, at step 460, the eNodeB 410 transmits data to the UE 430 over a radio communications channel, for example the PDSCH associated with the channel estimation process. At step 470, the UE 430 demodulates PDSCH using the channel characteristics estimated in step 456. Other channel statistics computed at step 452, such as timing information and/or frequency synchronization information, may also be used in the data demodulation process.

Figure 5A:
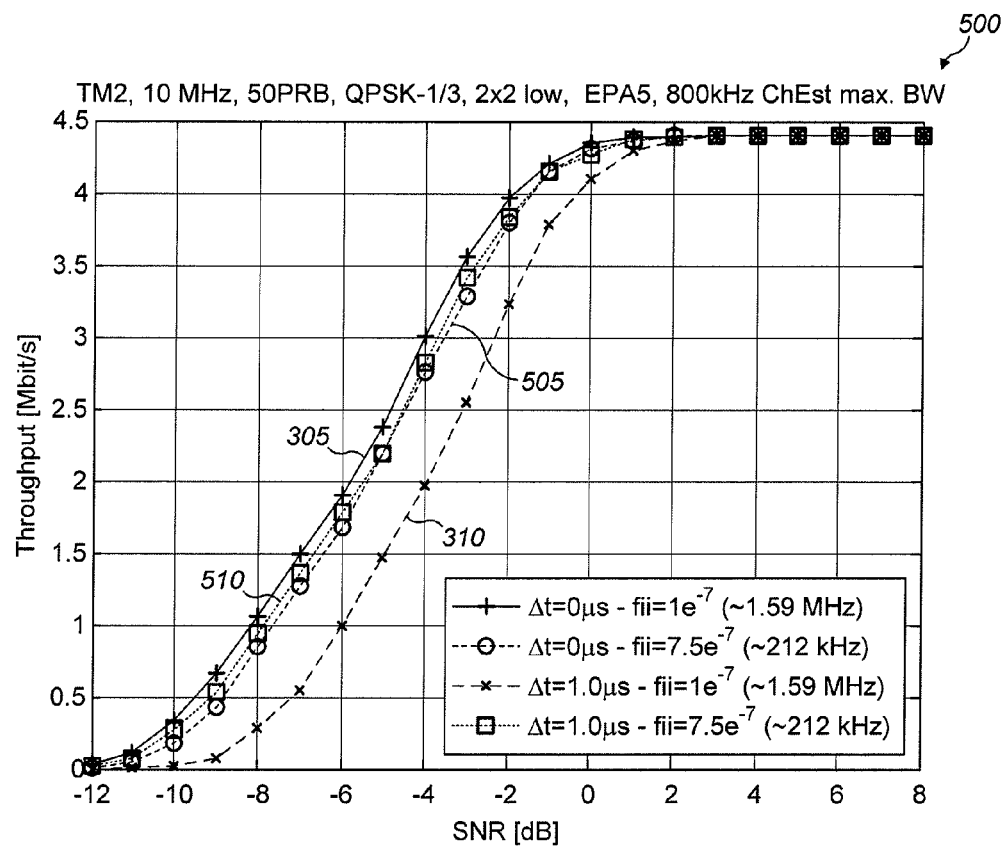
FIG. 5A is a chart showing data throughput versus SNR for the signals of FIG. 3A, together with two new sets of signals that are received using an exemplary UE configured according to an embodiment of the present invention.
Figure 5B:
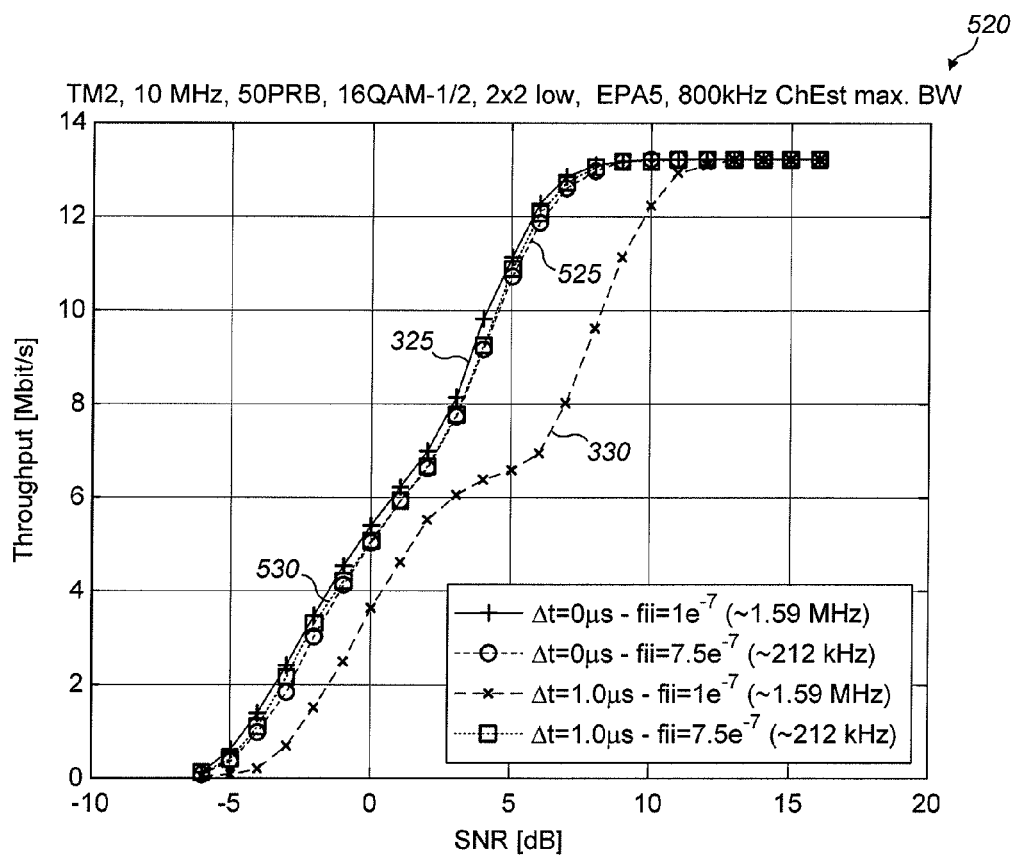
FIG. 5B is a chart showing data throughput versus SNR for the signals of FIG. 3B, together with two new sets of signals that are received using an exemplary UE configured according to an embodiment of the present invention.
Figure 5C:
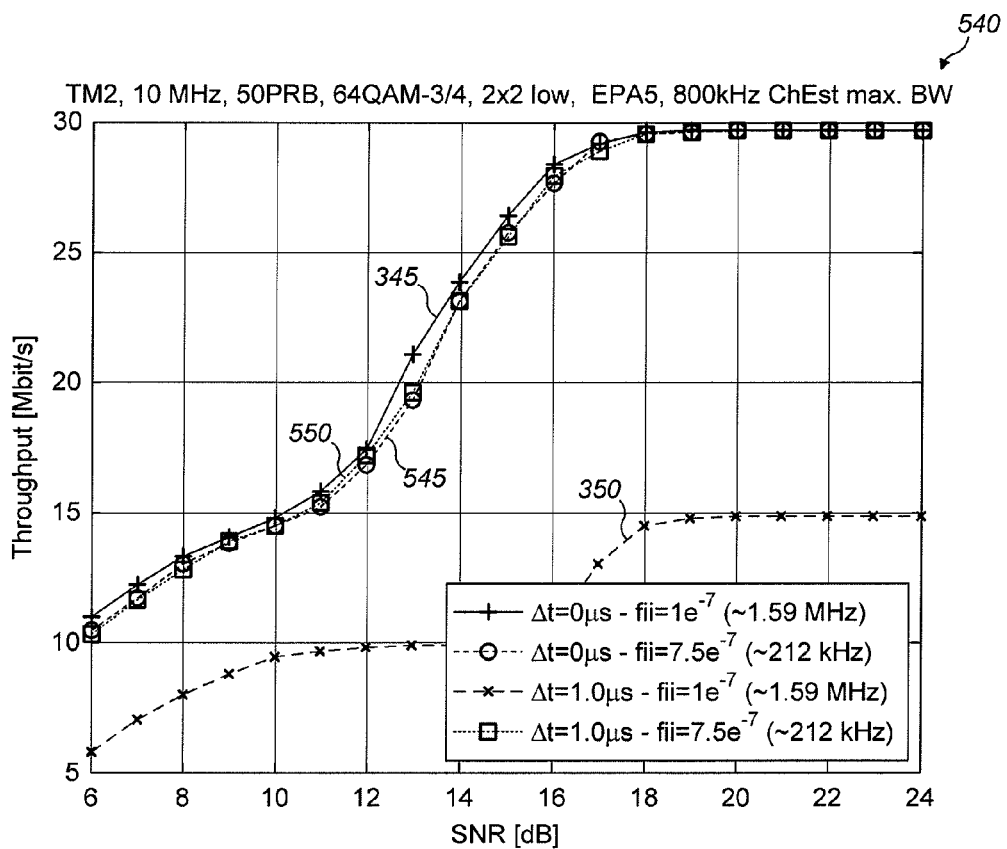
FIG. 5C is a chart showing data throughput versus SNR for the signals of FIG. 3C, together with two new signals that are received using an exemplary UE configured according to an embodiment of the present invention.

FIGS. 5A to 5C comprise the charts of FIGS. 3A to 3C showing data throughput versus SNR for two sets of signals, together with two new sets of signals that are received using an exemplary UE configured according to an embodiment of the present invention, such as the examples described below. The charts demonstrate how the use of a particular set of channel statistics can improve data throughput. In each chart, two additional curves 505/510, 525/530, 545/550 represent two new sets of signals that have been received based on a channel estimation process that is configured differently than the channel estimation process used with regard to the curves of FIGS. 3A to 3C. In particular, in the cases of the two additional curves in FIGS. 5A to 5C, a particular CSI-RS resource has been indicated to a UE in control information transmitted from an eNodeB. Due to the use of this particular CSI-RS resource a different set of channel statistics are used in channel estimation, resulting in an estimated coherence bandwidth of ~212 kHz being assumed by a channel estimator. This estimated coherence bandwidth is significantly less than the coherence bandwidth of 1.59 MHz, as assumed when no control information regarding one or more of a plurality of channel-state information (CSI) reference signals was sent to the UE.

The first of the two additional curves 505, 525, 545 illustrates the case when there is no additional propagation delay compared to FFT timing but the new channel estimation configuration is used. As can be seen there is only a small (~0.5 dB) loss in throughput performance with respect to curves 305, 325, 345 representing the first set of signals in FIGS. 3A to 3C. This demonstrates that adapting a channel estimator to a perceived delay spread allows for at least some recovery from the loss experienced by the additional delay (e.g. due to UE having another time synchronization reference). In other examples, the additional propagation delay may be estimated, for example in response to the content of control information. Any additional propagation delay that is found may be accounted for by: applying compensation in time domain or rotation in frequency domain to the received RS (by proper phase modulation); applying the same channel estimator filter tuned to $B_c=1.59$ MHz; and finally rotating back the channel estimate to the initial domain where UE is synchronized. In these other examples it may be possible to almost match the performance of curves 305, 325, 345 with a perfectly-tuned channel estimator.

The second of the two additional curves 510, 530, 550 shows the effect on channel estimation configuration using control information regarding one or more of a plurality of channel-state information (CSI) reference signals was sent to the UE. In this case there is assumed to be a 1 μs additional propagation delay compared to FFT timing, i.e. the same additional propagation delay as for curves 310, 340, 350 representing the second set of signals in FIGS. 3A to 3C. However, as can be seen by comparing curves 510, 530, 550 with curves 310, 340, 350, using the methods of the described examples, throughput performance is greatly improved, e.g. is on par with the curves 505, 525, 545 for which there is no additional propagation delay. In this case there is no catastrophic loss in performance as observed for curves 310, 340, 350.

The above example demonstrates that channel statistics need to be derived from a proper set of reference signals in order to achieve good UE demodulation performance, i.e. the reference signals used to estimate channel statistics should experience similar propagation conditions to the reference signals used for demodulation, e.g. such that common channel statistics apply to both sets of reference signals. The same applies for CSI feedback. The examples described herein provide control information that is signalled to the UE to indicate which antenna ports and/or set of antenna ports are to be assumed as a CSI-RS reference for assessing channel statistics for demodulation of a given transmission.

FIG. 6A is a table showing an exemplary bit field that may comprise at least a portion of the control information in the exemplary dynamic signalling scheme of the first example. The bit field is two bits in length, as such signalling four different configurations. The bit field of FIG. 6A is suitable for configurations with two available CSI-RS resources, for example the exemplary cell of FIG. 2. A bit field value of '00', transmitted from an eNodeB to a UE, indicates that a first CSI-RS resource is to be used as a reference resource for channel statistics for the whole band of a radio communications channel. A bit field value of '01', transmitted from an eNodeB to a UE, indicates that a second CSI-RS resource is to be used as a reference resource for channel statistics for the whole band of a radio communications channel. A bit field value of '10', transmitted from an eNodeB to a UE, indicates that both CSI-RS resources are assumed to be transmitting over the whole band, i.e. UE takes as the CSI-RS reference resource for channel statistics the aggregated (joint) radio channel from both CSI-RS resources. Finally, a bit field value of '11', transmitted from an eNodeB to a UE, indicates that the latest CSI feedback report transmitted by the UE is to be used to determine the CSI-RS resource to be used as a reference resource.

In the examples described above, the control information indicates to the UE which CSI-RS resource is to be used as a reference resource, for example for selection of channel statistics to configuration channel estimators. It does not in principle mandate the eNodeB to transmit from the signalled CSI-RS resources. In the case that a eNodeB does not transmit from one or more signalled CSI-RS resources, network configuration would need to be such that channel estimation, e.g. for timings etc., can be handled by UE using the signalled indication. Thus scheduling freedom, from a network and/or eNodeB perspective, remains when implementing embodiments of the present invention.

The examples described above may be used in configuration with a transmission rank larger than 1, where each spatial layer is transmitted from non-geographically co-located, i.e. separate, antenna ports and/or transmission points. In an example of rank-2 transmission involving a total of two transmission points (TP#1 and TP#2), each transmission point transmits a single spatial layer. A UE is then configured to use two DM-RS ports (e.g. AP7 and AP8). Each DM-RS port is effectively transmitting a single layer from a single transmission point (e.g. TP#1 transmits AP7 and TP#2 transmits AP8). In this case, the UE determines the reference for channel statistics for each of the two DM-RS ports. To do this the control information transmitted by an eNodeB to the UE may apply per DM-RS port. For example, a CSI-RS resource associated to TP#1 may be assumed as reference for channel statistics for AP#7, while a CSI-RS resource associated to TP#2 should be assumed as reference for channel statistics for AP#8.

In a second example, antenna ports corresponding to each CSI-RS resource are divided into subsets. The control information in this case indicates which of these subsets can be considered co-located by a UE, or, put alternatively, which subsets can be considered together in estimation of the channel statistics. If a UE is provided with control information that indicates which antenna ports are co-located, this may increase the accuracy of channel statistic estimation, as the more antenna ports the UE can assume are co-located, the more reference signal samples are available for statistical estimations.

An exemplary signalling scheme for the second example may use semi-static signalling, similar to that described above for the first example, e.g. for LTE systems via higher layer signalling such as RRC. In certain cases, due to the nature of antenna design, the number of CSI-RS ports within one CSI-RS resource may number 1, 2, 4 or 8. In this case, a number of antenna port co-location configurations are possible and an example of these is set out in the table of FIG. 6B. For example, for a 2-Tx case, i.e. a case with 2 antenna ports forming one CSI-RS resource, both antenna ports may be co-located ('[2]') or each antenna port may be physically separated ('[1 1]'), wherein each array entry for the 'Options Available for Signalling' field of the table of FIG. 6B indicates the number of co-located antenna ports at a particular location. As shown in FIG. 6B, a 2-Tx case requires one bit, i.e. the control information may comprise a bit field one-bit in length. Corresponding entries for the 4-Tx and 8-Tx cases are shown in FIG. 6B. It should be noted that the table of FIG. 6B is provided for example only, and other forms for the control information may be used, for example an indication of a particular configuration from an exhaustive set of all possible configurations may be provided. In this case an eNodeB is able to map physical antenna ports map to CSI-RS antenna ports such that, for example, the configurations shown in FIG. 6B are possible.

A variation of the exemplary dynamic signalling scheme of the first example will now be described with regard to FIGS. 6C and 6D. FIGS. 6C and 6D show examples of implicit signalling according to the variation.

In the table of FIG. 6C the control information is embodied in a pre-existing confirmation bit that is transmitted to a UE to indicate a frequency-selective scheduling decision. In the pre-existing case, the bit field indicates that a frequency-selective scheduling decision is not or is to be taken based on a recommendation determined by the UE. For example, a value of '0' indicates that a frequency-selective scheduling decision is not to be taken based on a recommendation determined by the UE, e.g. a wideband or some default scheduling decision applies, and a value of '1' indicates that a frequency-selective scheduling decision is to be taken based on a recommendation determined by the UE. In the present variation, in the case of a bit value of '0', the UE determines that a default CSI-RS resource for assessing channel statistics is to be used, wherein the default CSI-RS resource may be preconfigured. In the case of a bit value of '1', the UE determines that a CSI-RS resource for assessing channel statistics is to be selected based on the latest CSI feedback report transmitted by the UE, for example as described above.

In the table of FIG. 6D the control information is embodied in a in a pre-existing confirmation bit that is transmitted to a UE to indicate a rate-matching decision. In the pre-existing case, the bit field indicates whether or not rate matching is to be performed based on a UE recommendation. For example, a value of '0' indicates that rate matching should not be performed based on a UE recommendation (in this case a possibly preconfigured default rate matching decision may apply) and a value of '1' indicates that rate matching is to be performed as set out in a recommendation provided by the UE. Like the example of FIG. 6C, in the present variation, in the case of a bit value of '0', the UE determines that a default CSI-RS resource for assessing channel statistics is to be used, wherein the default CSI-RS resource for assessing channel statistics may be preconfigured, and in the case of a bit value of '1', the UE determines that a CSI-RS resource for assessing channel statistics is to be selected based on the latest CSI feedback report transmitted by the UE. The examples of FIGS. 6C and 6D illustrate how, in a general case, the use of implicit signalling enables a UE to obtain the control information, e.g. regarding the CSI antenna ports, based on other signalled parameter(s) and/or events, e.g. those signalled from a base station to the UE.

Figure 7:
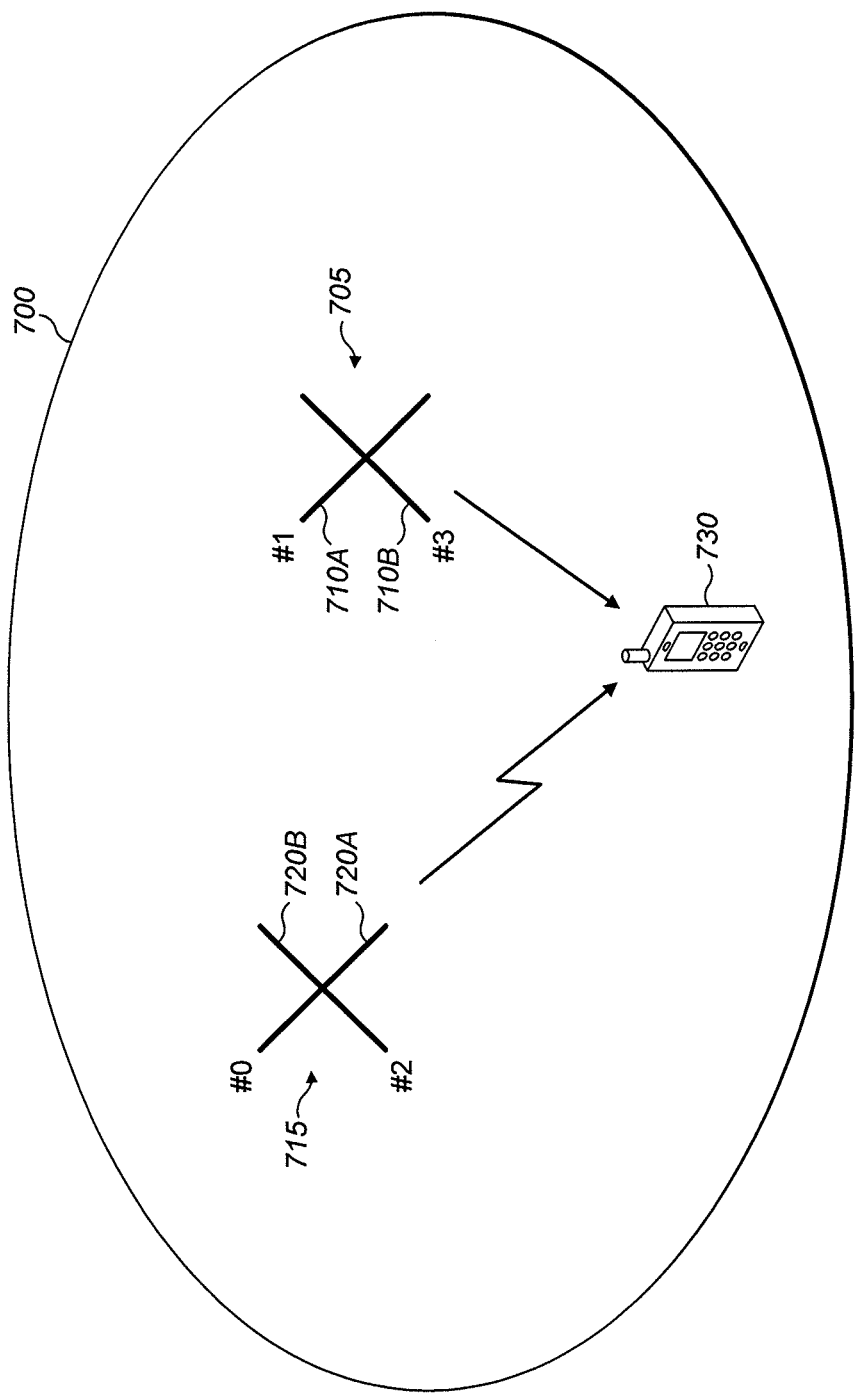
FIG. 7 is a schematic diagram showing a UE receiving signals from a two different transmission points, each transmission point having two co-located, cross-polarised antennas ports.

A variation of the second example will now be described with reference to FIG. 7. FIG. 7 shows an exemplary cell 700 of a cellular wireless network that comprises two transmission points 705 and 715, each transmission point transmitting to a UE 730. A first transmission point 705 has two cross-polarized antenna elements 710 that are mapped to two antenna ports. A second transmission point 715 also has two cross-polarized antenna elements 720 that are also mapped to two further antenna ports. If indexing of antenna elements follows the convention used by the 3GPP, antennas of the same polarization (vertical or horizontal) are indexed first and then indices for the antennas of the other polarization come subsequently. For example, antenna elements 710A and 720A are indexed in FIG. 7 as antenna ports #0, #1.

Antenna elements of the other polarization are then indexed. For example, antenna elements 710B and 720B are indexed in FIG. 7 as antenna ports #2, #3. In this example, antenna ports #0 and #2 are co-located, as are antenna ports #1 and #3; however subsets of antenna ports {#0, #1} and {#2, #3} are non-co-located, i.e. are physically and/or geographically separated. In this variation, the control information is arranged to indicate co-located antenna port indices to the UE. For the example of FIG. 7 an eNodeB may transmit control information such as {#0, #2} and {#1, #3} to indicate co-located antenna ports.

In certain LTE systems, codebooks for CSI feedback have been optimised for particular antenna configurations. The variation of the second example can support these antenna configurations. For example, a double codebook comprising one wideband and/or long-term component and one narrowband and/or short-term component per subband may be applied over two geographically non-co-located, i.e. separate, transmission points. These transmission points may be configured as shown in FIG. 7 and as such co-located antenna ports may be indicated in the control information.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

The above embodiments are to be understood as illustrative examples of the invention. Further embodiments of the invention are envisaged. For example, subband methods may be applied across the whole band, i.e. to a wideband, and vice versa. The described examples may be applied to telecommunications systems other than LTE. While certain examples have described channel estimation based on DM-reference signals, for example for data demodulation, the examples may, in alternate implementations, be applied to channel estimation based on other forms of reference signal, i.e. reference signals other than DM-reference signals. Furthermore, the explicit and implicit bit fields shown in FIGS. 6A to 6D are to be considered as examples that have been used for ease of explanation, explicit signalling may use different forms of data to achieve the function of providing control information and, likewise, implicit signalling may be based on pre-existing fields other than those described herein. It is to be understood that any feature described in relation to any one embodiment or example may be used alone, or in combination with other features described, and may also be used in combination with one or more features of any other of the embodiments or examples, or any combination of any other of the embodiments or examples. Furthermore, equivalents and modifications not described above may also be employed without departing from the scope of the invention, which is defined in the accompanying claims.

The invention claimed is:

1. A method for configuring a user equipment in a cellular wireless network, the method comprising:
receiving, at the user equipment, control information regarding one or more of a plurality of channel-state information (CSI) reference signals, said one or more of the plurality of CSI reference signals being receivable by the user equipment from one or more of a plurality of antenna ports that form part of the cellular wireless network, the plurality of CSI reference signals being associated with corresponding antenna ports, the control information indicating which of the plurality of antenna ports are transmitting CSI reference signals that are to be used as reference and being received over a radio communications downlink from a node in the cellular wireless network, the control information further indicating which of the plurality of CSI reference signals are to be used as a reference signal set for use in configuration of the user equipment; and configuring, at the user equipment, estimation of one or more radio communication channels based on the received control information regarding the one or more of the plurality of CSI reference signals, wherein channel statistics associated with the reference signal set are used to estimate channel characteristics for a demodulation process that uses demodulation (DM) reference signals.

2. A method according to claim 1, wherein the control information indicates one of:
   a CSI reference signal resource to be used as the reference signal set, the CSI reference signal resource comprising a subset of the plurality of CSI reference signals from the antenna ports;
   a subset of CSI reference signal resources to be used as the reference signal set; or
   a confirmation that a CSI feedback report from the user equipment is to be used to select a subset of CSI reference signal resources to be used as the reference signal set.

3. A method according to claim 1, wherein the configuring comprises:
   initializing, at the user equipment, one or more receiver modules using the channel statistics; and
   using the initiated one or more receiver modules to estimate the channel characteristics for the demodulation process that uses DM reference signals.

4. A method according to claim 1, wherein the control information provides co-location information for the plurality of antenna ports.

5. A method of transmitting control information to a user equipment in a cellular wireless network, the method comprising:
   transmitting, from a node in the cellular wireless network to the user equipment over a radio communications downlink, control information regarding one or more of a plurality of channel-state information (CSI) reference signals, the cellular wireless network comprising a plurality of antenna ports for use in at least transmission, the plurality of CSI reference signals being associated with corresponding antenna ports,
   the control information regarding the one or more of the plurality of CSI reference signals indicating which of the plurality of antenna ports are transmitting CSI reference signals that are to be used as reference and being for use, by the user equipment, in estimating one or more radio communication channels, and the control information further indicating which of the plurality of CSI reference signals are to be used as a reference signal set for use in configuration of a demodulation process at the user equipment, the demodulation process using demodulation (DM) reference signals.

6. A method according to claim 5, wherein the control information indicates one of:
   a CSI reference signal resource to be used as the reference signal set, the CSI reference signal resource comprising a subset of the plurality of CSI reference signals from the antenna ports;
   a subset of CSI reference signal resources to be used as the reference signal set; or
   a confirmation that a CSI feedback report from the user equipment is to be used to select a subset of CSI reference signal resources to be used as the reference signal set.

7. A method according to claim 5, comprising:
   transmitting, from one or more transmission points each comprising one or more of the plurality of antenna ports, data to the user equipment for demodulation based on channel characteristics estimated using channel statistics obtained using the transmitted control information.

8. A method according to claim 5, wherein the control information provides co-location information for the plurality of antenna ports.

9. Apparatus comprising a processing system for a user equipment for use in a cellular wireless network, the processing system comprising at least one processor and at least one memory including computer program instructions, and being constructed and arranged to cause the user equipment to:
   receive one or more of a plurality of channel-state information (CSI) reference signals from one or more of a plurality of antenna ports that form part of the cellular wireless network, the plurality of CSI reference signals being associated with corresponding antenna ports;
   receive control information regarding one or more of the plurality of CSI reference signals, the control information indicating which of the plurality of antenna ports are transmitting CSI reference signals that are to be used as reference and being received over a radio communications downlink from a node in the cellular wireless network, the control information further indicating which of the plurality of CSI reference signals are to be used as a reference signal set for use in configuration of the user equipment; and
   configure estimation of one or more radio communication channels based on the received control information regarding the one or more of the plurality of CSI reference signals, wherein channel statistics associated with the reference signal set are used to estimate channel characteristics for a demodulation process that uses demodulation (DM) reference signals.

10. Apparatus according to claim 9, wherein the control information indicates one of:
    a CSI reference signal resource to be used as the reference signal set, the CSI reference signal resource comprising a subset of the plurality of CSI reference signals from the antenna ports;
    a subset of CSI reference signal resources to be used as the reference signal set; or
    a confirmation that a CSI feedback report from the user equipment is to be used to select a subset of CSI reference signal resources to be used as the reference signal set.

11. Apparatus according to claim 9, wherein the processing system is constructed and arranged to cause the user equipment to:
    initialize one or more receiver modules using the obtained one or more channel statistics; and
    obtain, using the initiated one or more receiver modules to estimate the channel characteristics for the demodulation process that uses DM reference signals.

12. Apparatus according to claim 9, wherein the control information provides co-location information for the plurality of antenna ports.

13. Apparatus for transmitting to a user equipment in a cellular wireless network, the apparatus comprising at least one processor and at least one memory including computer program instructions that are constructed and arranged to cause the apparatus to:
  transmit to the user equipment over a radio communications downlink control information regarding one or more of a plurality of channel-state information (CSI) reference signals, the cellular wireless network comprising a plurality of antenna ports for use in at least transmission, the plurality of CSI reference signals being associated with corresponding antenna ports,
  the control information indicating which of the plurality of antenna ports are transmitting CSI reference signals that are to be used as reference and being for use, by the user equipment, in estimating one or more radio communication channels, and the control information further indicating which of the plurality of CSI reference signals are to be used as a reference signal set for use in configuration of a demodulation process at the user equipment, the demodulation process using demodulation (DM) reference signals.

14. Apparatus according to claim 13, wherein the control information indicates one of:
  a CSI reference signal resource to be used as the reference signal set, the CSI reference signal resource comprising a subset of the plurality of CSI reference signals from the antenna ports;
  a subset of CSI reference signal resources to be used as the reference signal set; or
  a confirmation that a CSI feedback report from the user equipment is to be used to select a subset of CSI reference signal resources to be used as the reference signal set.

15. Apparatus according to claim 13, wherein the at least one processor and at least one memory including computer program instructions are constructed and arranged to cause the apparatus to:
  transmit, from one or more transmission points each comprising one or more of the plurality of antenna ports, data to the user equipment for demodulation based on channel characteristics estimated using channel statistics obtained using the transmitted control information.

16. Apparatus according to claim 13, wherein the control information provides co-location information for the plurality of antenna ports.

* * * * *